United States Patent [19]

Boylan

[11] Patent Number: 4,942,617
[45] Date of Patent: Jul. 17, 1990

[54] EARPHONE CORD TAKE-UP DEVICE

[76] Inventor: Mark Boylan, 55 Elm St., Hicksville, N.Y. 11801

[21] Appl. No.: 288,775

[22] Filed: Dec. 22, 1988

[51] Int. Cl.⁵ .................. H04M 1/05; H04R 1/02; H04R 1/06; H04R 1/10
[52] U.S. Cl. .................................... 381/182; 381/187; 381/188; 381/205; 439/17; 455/89; 455/90
[58] Field of Search ............... 381/182, 183, 187, 188, 381/205; 455/89, 90, 351; 439/17–30

[56] References Cited

U.S. PATENT DOCUMENTS

| 2,470,687. | 5/1949 | Cafrella et al. | 455/351 |
| 3,426,282 | 2/1969 | Brady | 381/187 |
| 3,798,389 | 3/1974 | Tokizaki | 381/187 |
| 3,851,123 | 11/1974 | Lipinski et al. | 455/351 |
| 3,984,645 | 10/1976 | Kresch | 379/430 |
| 4,691,383 | 9/1987 | DeMars | 379/430 |
| 4,765,481 | 8/1988 | Walsh et al. | 455/351 |
| 4,775,083 | 10/1988 | Burger et al. | 455/351 |

FOREIGN PATENT DOCUMENTS

| 59-51697 | 3/1984 | Japan | 381/188 |
| 60-217792 | 10/1985 | Japan | 381/188 |
| 60-223290 | 11/1985 | Japan | 381/187 |
| 60-230798 | 11/1985 | Japan | 381/187 |

Primary Examiner—Jin F. Ng
Assistant Examiner—Danita R. Byrd
Attorney, Agent, or Firm—Michael I. Kroll

[57] ABSTRACT

An earphone cord take-up device is provided and consists of a hollow casing worn on a belt in which an earphone cord that is electrically connected within the casing to a jack cord can be extended therefrom when needed. Within the casing are stop rests for the earphones when the earphones are in the retracted positon.

1 Claim, 1 Drawing Sheet

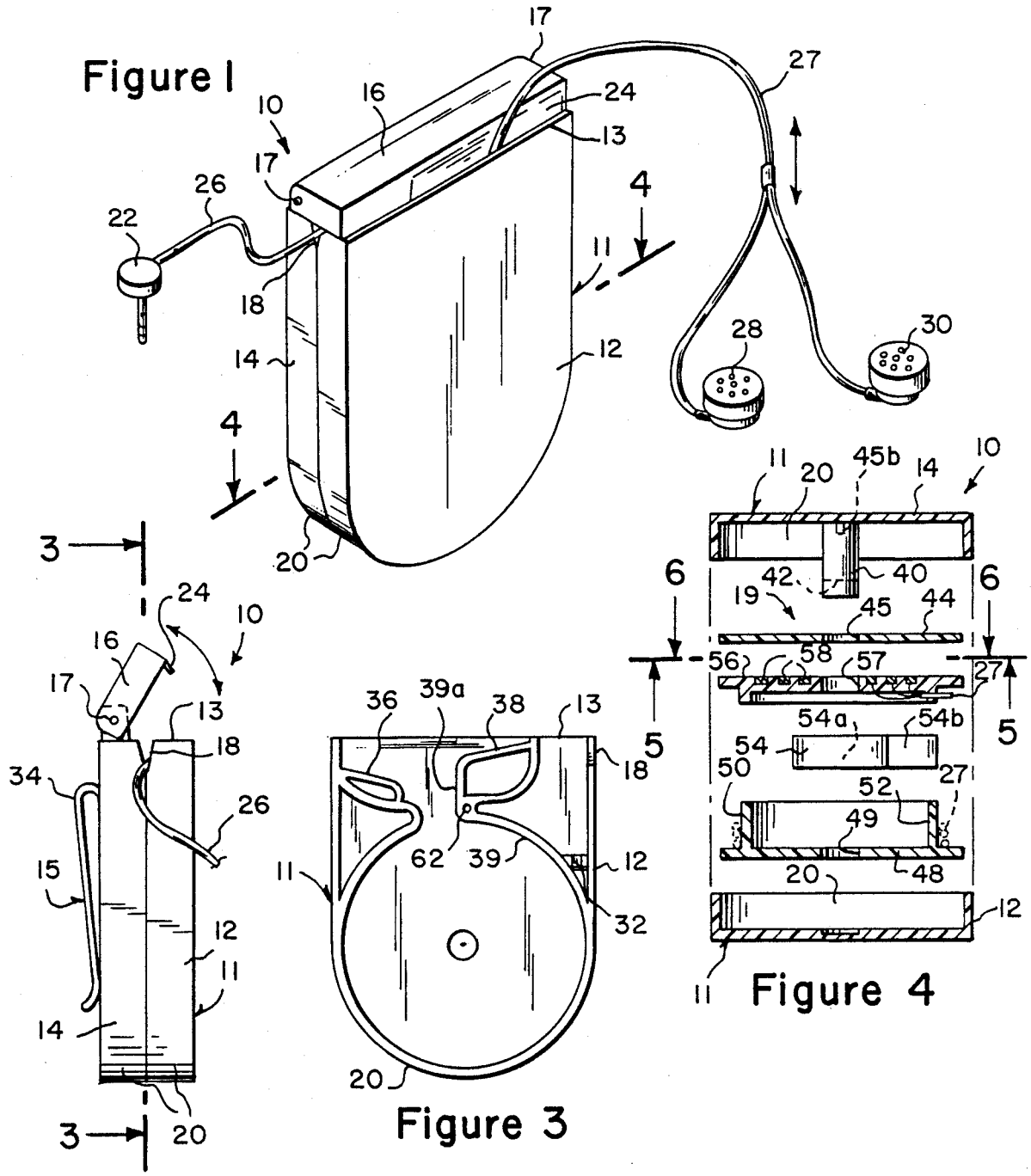
Figure 1
Figure 2
Figure 3
Figure 4
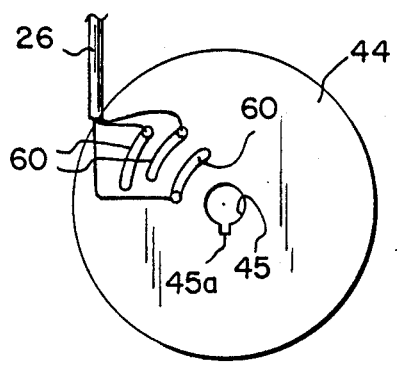
Figure 5
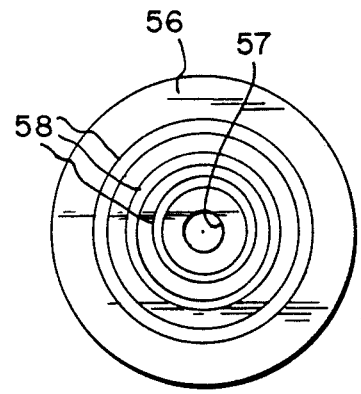
Figure 6

EARPHONE CORD TAKE-UP DEVICE

BACKGROUND OF THE INVENTION

1. Field of the Invention

The instant invention relates generally to earphones and more specifically it relates to an earphone cord take-up device.

2. Description of the Prior Art

Numerous earphones have been provided in prior art that are adapted to convert electrical signals, as from telephones or radio receivers, to audible sounds and fits over or in the ears. The earphones usually contain elongated cords with plug in jacks. While these units may be suitable for the particular purpose to which they address, they would not be as suitable for the purposes of the present invention as heretofore described.

SUMMARY OF THE INVENTION

A primary object of the present invention is to provide an earphone cord take-up device that will overcome the shortcomings of the prior art devices.

Another object is to provide an earphone cord take-up device that is worn on a belt in which an earphone cord that is electrically connected within the device to a jack cord can be extended therefrom when needed.

An additional object is to provide an earphone cord take-up device in which the casing will contain therein stop rests for the earphones when the earphones are in the retracted position.

A further object is to provide an earphone cord take-up device that is simple and easy to use.

A still further object is to provide an earphone cord take-up device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURE

FIG. 1 is a perspective view of the invention.

FIG. 2 is a side view taken in direction of arrow in FIG. 1 with top cover in an open position.

FIG. 3 is a cross sectional view taken along line 3—3 in FIG. 2.

FIG. 4 is an exploded cross sectional view taken along line 4—4 in FIG. 1 showing the internal parts in greater detail.

FIG. 5 is an elevational view of the circular plate as indicated by line 5—5 in FIG. 4 showing the contact fingers thereon.

FIG. 6 is an elevational view of the spool cap as indicated by line 6—6 in FIG. 4, showing the concentric contact rings thereon.

DETAILED DESCRIPTION OF THE PREFERRED EMBODIMENTS

Turning now descriptively to the drawings, in which similar reference characters denote similar elements throughout the several views, FIGS. 1 through 6 illustrate an earphone cord take-up device 10 consisting of a hollow casing 11 that has an open top 13. A cover 16 is pivotly mounted at hinges 17 to the open top 13 of the casing 11. A fastener 15 is supplied for attaching the casing 11 to a belt of a person (not shown). A pair of elongated cords 26 and 27 are electrically connected to each other within the casing 11 and each extends outwardly from the open top 13 of the casing. A jack 22 is connected to cord 26 while a pair of earphones 28, 30 are connected to other cord 27. A mechanism 19 is provided for rotatably holding the cord 27 with the earphones 28, 30 within the casing 11 so that the cord 27 with the earphones 28, 30 can be extended therefrom. The fastener 15 is a spring clip 34 affixed to the rear of the casing 11 that can snap onto the belt.

The casing 11 has a tapered notch 18 formed on one side at the open top 13 thereof so that the cord 26 with the jack 22 can exit therefrom. The cover 16 has a passageway 24 formed on front so that the cord 27 with the earphones 28, 30 can exit therethrough.

The casing 11 is divided into a rear portion 14 and a front portion 12 both of which have a curved bottom wall 20. A pair of earphone rests 36, 38 are formed within the front portion 12 of the casing 11 so that when the cover is opened and the cord 27 with the earphones 28, 30 is in a retracted position the earphones will be held within the earphone rests 36, 38.

The mechanism 19 includes a curved inner wall 39 formed within the front portion 12 of the casing 11 in conjunction with the curved bottom wall 20 of the casing thus forming a cylindrical chamber therein. The curved inner wall 39 has a channel 39a extending to the earphone rests 36, 38.

A spindle 40 is formed into the rear portion 14 of the casing 11 and is transversely positioned within the casing with respect to the open top 13 thereof. The spindle 40 has a slot 42 at free end and a key 45b carried on other end thereof. A circular plate 44 carries a plurality of contact fingers 60 thereon which are electrically connected to the cord 26 with jack 22. The plate 44 has a central hole 45 and a keyway 45a so that the central hole 45 can be placed onto the spindle 40 with the keyway 45a engaging with the key 45b to prevent the plate 44 from rotating. A spool cap 56 carries a plurality of concentric contact rings 58 thereon which are electrically connected to the cord 27 with the earphones 28, 30. The spool cap 56 has a central hole 57 so that the central hole 57 can be placed onto the spindle 40 allowing the spool cap 56 to rotate thereon with the contact rings 58 making electrical contact with the contact fingers 60.

A flat spiral spring 54 has an inner end 54a and an outer end 54b. The inner end 54a is held within the slot 42 in the spindle 40. A spool base 48 has a central hole 49 and a reinforced wall 50 with a slot 52 therein. The central hole 49 of the spool base 48 can be placed onto the spindle 40 so that the outer end 54b of the spring 54 can be held within the slot 52 within the wall 50 of the spool base 48, while the spool cap 56 can snap onto the wall 50 of the spool base 48. The cord 27 from the earphones 28, 30 can enter the channel 39a in the front portion 12 of the casing 11 and wrap around the wall 50 of the spool base 48.

A mounting hole 62 can be provided in the front portion 12 of the casing 11 so that a fastener such as a screw (not shown) can connect the front portion 12 and rear portion 14 together while at the same time allow a built-in cord hold 32 to grip the cord 26 from the jack 22.

A person simply attaches the casing 11 via spring clip 34 onto a belt, plugs the jack 22 into a radio or the like and then can pull the cord 27 out of the casing 11 so that the earphones 28, 30 can be put into the ears to listen to the radio.

LIST OF REFERENCE NUMBERS 10 earphone cord take-up device
11 hollow casing
12 front portion
13 open top
14 rear portion
15 fastener
16 cover
17 hinges
18 tapered notch
19 mechanism
20 curved bottom wall
22 jack
24 passageway
26 elongated cord for jack
27 elongated cord for earphones
28 earphone
30 earphone
32 cord holder
34 spring clip
36 earphone rest
38 earphone rest
39 curved inner wall
39a channel
40 spindle
42 slot
44 circular plate
45 central hole
45a keyway
45b key on spindle
48 spool base
49 central hole
50 reinforced wall
52 slot
54 flat spiral spring
54a inner end
54b outer end
56 spool cap
57 central hole
58 contact rings
60 contact fingers
62 mounting hole Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is new and desired to be protected by Letters Patent is set forth in the appended claims.

1. An earphone cord take-up device which comprises:
    (a) a hollow casing having an open top, said casing having a tapered notch formed on one side at the open top thereof so that said cord with said jack can exit therefrom, said casing being divided into a rear portion and a front portion both of which having a curved bottom wall;
    (b) a cover pivotally mounted to the open top of said casing, said cover having a passageway formed on front so that said cord with said earphones can exit therethrough;
    (c) means for attaching said casing to a belt of a person, said attaching means include a spring clip affixed to rear of said casing that can snap onto the belt;
    (d) a pair of elongated cords electrically connected to each other within said casing and each extending outwardly from the open top of said casing;
    (e) a jack connected to one of said cords;
    (f) a pair of earphones connected to other of said cords;
    (g) means for rotatably holding said cord with said earphones within said casing so that said cord with said earphones can be extended therefrom, said rotatably holding means includes a curved inner wall formed within said front portion of said casing in conjunction with said curved bottom wall of said casing thus forming a cylindrical chamber therein, said curved inner wall having a channel extending to said earphone rests, and a spindle formed into said rear portion of said casing and being transversely positioned within said casing with respect to the open top thereof, said spindle having a slot at free end and a key carried on other end thereof, a circular plate carrying a plurality of contact fingers thereon which are electrically connected to said cord with said jack, said plate having a central hole and a keyway so that the central hole can be placed onto said spindle with said keyway engaging with the key to prevent said plate from rotating, a spool cap carrying a plurality of concentric contact rings thereon which are electrically connected to said cord with said earphones, said spool cap having a central hole so that the central hole can be placed onto said spindle allowing said spool cap to rotate thereon with the contact rings making electrical contact with the contact fingers, a flat spiral spring having an inner end and an outer end, said inner end held within the slot in said spindle, a spool base having a central hole and a reinforced wall with a slot therein, the central hole of said spool base can be placed onto said spindle so that the outer end of said spring can be held within the slot within the wall of said spool base, while said spool cap can snap onto the wall of said spool base so that said cord from said earphones can enter the channel in the front portion of said casing and wrap around the wall of said spool base; and
    (h) a pair of earphone rests formed within said front portion of said casing so that when said cover is opened and said cord with said earphones are in a retracted position said earphones will be held within said earphone rests.

* * * * *